(12) United States Patent
Liu

(10) Patent No.: US 10,178,597 B2
(45) Date of Patent: Jan. 8, 2019

(54) METHOD AND DEVICE FOR CALLING IN NETWORK CONGESTION STATE

(71) Applicant: GUANGDONG OPPO MOBILE TELECOMMUNICATIONS CORP., LTD., Dongguan (CN)

(72) Inventor: Hai Liu, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/802,569

(22) Filed: Nov. 3, 2017

(65) Prior Publication Data

US 2018/0206169 A1    Jul. 19, 2018

(30) Foreign Application Priority Data

Jan. 17, 2017  (CN) .......................... 2017 1 0031426

(51) Int. Cl.
*H04W 74/00* (2009.01)
*H04W 36/26* (2009.01)
(Continued)

(52) U.S. Cl.
CPC ........... *H04W 36/26* (2013.01); *H04W 36/22* (2013.01); *H04W 36/36* (2013.01); *H04W 76/18* (2018.02);
(Continued)

(58) Field of Classification Search
None
See application file for complete search history.

(56) References Cited

U.S. PATENT DOCUMENTS 9,414,298 B1 * 8/2016 Pasupuleti ............ H04W 48/02
2009/0165083 A1 * 6/2009 Mclean .................. G06F 21/10
726/1

(Continued)

FOREIGN PATENT DOCUMENTS

CN 102754485 A 10/2012
CN 104871634 A 8/2015
(Continued)

OTHER PUBLICATIONS

PCT/CN2017/108502 English Translation of the International Search Report and Written Opinion dated Feb. 2, 2018, 12 pp.
(Continued)

*Primary Examiner* — San Htun
(74) *Attorney, Agent, or Firm* — Lathrop Gage LLP

(57) ABSTRACT

The present disclosure relates to a communication field, and provides a method for calling in a network congestion state. The method includes: sending a connection request by a smart terminal to a base station of an enabled cell, and starting a timer; when the smart terminal does not receive a connection response after the timer passes a first preset time period, determining a timeout of the enabled cell and setting the enabled cell as being disabled in a second preset time period; repeating actions of sending, starting, determining and setting, until the smart terminal receives the connection response within the first preset time period; and establishing a connection by the smart terminal with a base station of a third cell feeding back the connection response. The present disclosure has an advantage of improving a call completion rate.

11 Claims, 5 Drawing Sheets

(51) Int. Cl.
*H04W 36/36* (2009.01)
*H04W 36/22* (2009.01)
*H04W 76/18* (2018.01)
*H04W 36/08* (2009.01)
*H04W 28/02* (2009.01)
*H04W 48/20* (2009.01)

(52) U.S. Cl.
CPC ........ *H04W 28/0205* (2013.01); *H04W 36/08* (2013.01); *H04W 48/20* (2013.01)

(56) References Cited

U.S. PATENT DOCUMENTS

| | | | |
|---|---|---|---|
| 2010/0222060 A1* | 9/2010 | Zhang | H04W 36/30 455/436 |
| 2012/0115454 A1* | 5/2012 | Liao | H04W 60/02 455/418 |
| 2012/0263039 A1 | 10/2012 | Ou et al. | |
| 2013/0329567 A1* | 12/2013 | Mathias | H04W 36/30 370/242 |
| 2014/0148169 A1 | 5/2014 | Li et al. | |
| 2015/0163732 A1 | 6/2015 | Chisu et al. | |
| 2016/0127969 A1* | 5/2016 | Pao | H04W 48/20 455/437 |

FOREIGN PATENT DOCUMENTS

| | | |
|---|---|---|
| CN | 107071824 A | 8/2017 |
| EP | 2696641 A | 2/2014 |

OTHER PUBLICATIONS

"3$^{rd}$ Generation Partnership Project; Technical Specification Group Radio Access Network; User Equipment (UE) procedures in idle mode and procedures for cell reselection in connected mode (Release 10)", 3GPP Standard; 3GPP TS 25.304, 3$^{rd}$ Generation Partnership Project (3GPP), Mobile Competence Center; 650, Route Des Lucioles; F-06921 Sophia-Antipolis Cedex; France, vol. RAN WG2, No. V10.5.0, published on Jun. 25, 2012, pp. 1-52.
Extended European Search Report for European Patent Application No. 17198904 dated May 22, 2018, 10 pp.

* cited by examiner

METHOD AND DEVICE FOR CALLING IN NETWORK CONGESTION STATE

CROSS-REFERENCE TO RELATED APPLICATIONS

This application is based on and claims priority of Chinese Patent Application No. 201710031426.7, filed on Jan. 17, 2017, the entire contents of which are incorporated herein by reference.

TECHNICAL FIELD

The present disclosure generally relates to a communication field, and more particularly, to a method and a device for calling in a network congestion state.

BACKGROUND

A call completion refers to a successful completion of a call, and a call completion rate refers to a probability of successful calls, which is equal to a rate of the desired number of successful calls to the number of total testing calls.

In the existing mobile communication network, when a mobile terminal selects a cell A but the cell A is in a network congestion state, the mobile terminal will perform the first switch to switch from the cell A to a cell B. If the cell B is also in the network congestion state, the mobile terminal will perform the second switch. During the second switch, the mobile terminal may select the cell A again. Since the time elapsed between two switches is short, the cell A may be still in the network congestion state, resulting in that the mobile terminal cannot access the cell A, thus resulting in a low call completion rate of the mobile terminal.

SUMMARY

The present disclosure aims to provide a method for calling in a network congestion state, which mainly solves the problem of low call completion rate in the related art.

Embodiments of the present disclosure provide a method for calling in a network congestion state. The method includes: sending a connection request by a smart terminal to a base station of an enabled cell, and starting a timer; when the smart terminal does not receive a connection response after the timer passes a first preset time period, determining a timeout of the enabled cell and setting the enabled cell as being disabled in a second preset time period, in which the second preset time period is greater than the first preset time period; repeating actions of sending, starting, determining and setting, until the smart terminal receives a connection response within the first preset time period; and establishing a connection by the smart terminal with a base station of a cell feeding back the connection response.

Embodiments of the present disclosure provide a method for calling in a network congestion state. The method includes: sending a first connection request by a smart terminal to a base station of a first cell, and starting a timer; when the smart terminal does not receive a first connection response after the timer passes a first preset time period, determining a timeout of the first cell and setting the first cell as being disabled in a second preset time period; sending a second connection request by the smart terminal to a base station of a second cell, and starting the timer; when the smart terminal does not receive a second connection response after the timer passes the first preset time period, determining a timeout of the second cell and setting the second cell as being disabled in the second preset time period; sending a third connection request by the smart terminal to a base station of a third cell, and starting the timer; and when the smart terminal receives a third connection response in the first preset time period, establishing a connection by the smart terminal with the base station of the third cell.

Embodiments of the present disclosure provide a device for calling in a network congestion state. The device includes a non-transitory computer-readable medium including computer-executable instructions stored thereon, and an instruction execution system which is configured by the instructions to implement at least one of a sending unit and a processing unit. The sending unit is configured to send a connection request to a base station of an enabled cell, and start a timer. The processing unit is configured to determine a timeout of the enabled cell and set the enabled cell as being disabled in a second preset time period, when a connection response is not received after the timer passes a first preset time period. The second preset time period is greater than the first preset time period. The instruction execution system is configured by the instructions to enable the sending unit and the processing unit to further execute actions respectively until the smart terminal receives a connection response within the first preset time period. The processing unit is further configured to establish a connection with a base station of a cell feeding back the connection response when the connection response is received within the first preset time period.

It should be understood by those skilled in the art that, although following detailed description is illustrated with reference to embodiments and drawings, the present disclosure is not limited thereto. Moreover, the scope of the present disclosure is broad, and it is intended to limit the scope of the present disclosure by appending claims.

BRIEF DESCRIPTION OF THE DRAWINGS

Other features, purposes, and advantages of the present disclosure will become more obvious by reading detailed description of non-restrictive embodiments with reference to drawings, in which.

DETAILED DESCRIPTION

Figure 1:
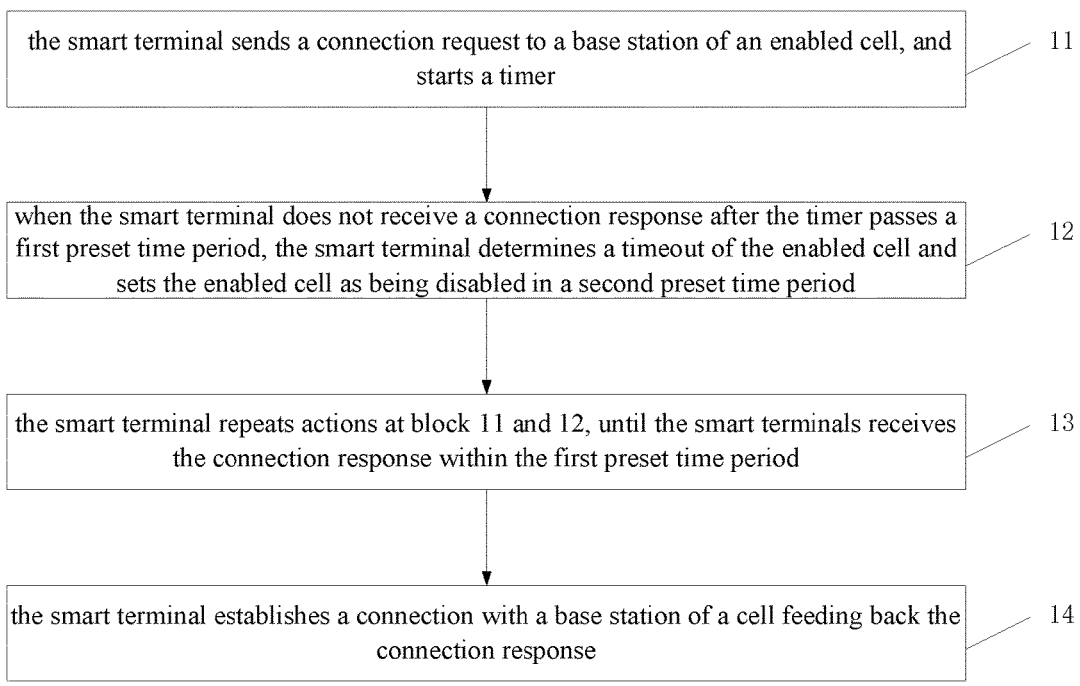
FIG. 1 is a flow chart of a method for calling in a network congestion state according to an embodiment of the present disclosure.

Before illustrating exemplary embodiments in detail, it should be noted that, some exemplary embodiments are described as processes or methods in a form of flow chart. Although respective operations are described as successive processing in the flow chart, some of them can be implemented in parallel, concurrently or simultaneously. Moreover, the order of respective operations can be rearranged. When the operations are completed, the processing can be terminated. However, there may be additional operations which are not included in the drawings. The processing can be corresponding to method, function, procedure, subroutine, subprogram, or the like.

The "computer device" in the context (also known as "computer") refers to a smart electronic device executing a predetermined processing procedure such as numeric calculation and/or logic calculation by running predetermined programs or instructions, which may include a processor and a memory. The predetermined processing procedure may be executed by the processor through running the instructions pre-stored in the memory, or may be executed by hardware such as ASIC, FPGA and DSP, or may be implemented by the combination of both. The computer device includes but is not limited to a server, a personal computer, a laptop computer, a tablet computer, and a smart phone.

The methods described below (some of which are illustrated in the flow charts) may be implemented by hardware, software, firmware, middleware, microcodes, hardware description language or any combination thereof. When it is implemented by software, firmware, middleware, or microcodes, the program codes or code segments for implementing necessary tasks may be stored in a machine-readable or computer-readable medium (such as storage medium). One or more processors may implement the necessary tasks.

Specific structures and function details disclosed herein are merely representative, and are for the purpose of describing exemplary embodiments of the present disclosure. However, the present disclosure may be achieved in many alternative forms, and should not be construed to be limited to the embodiments illustrated herein.

It should be understood that, although terms such as "first" and "second" are used herein to describe respective units, these units should not be construed to be limited to these terms. These terms are merely used to distinguish one unit from another unit. For example, the first unit may be referred to as the second unit, without departing from the scope of the present disclosure. Analogously, the second unit may be referred to as the first unit. The term "and/or" used herein include any (all) combination(s) of one or more listed features.

The terms used herein are merely for describing specific embodiments, are not intended to limit exemplary embodiments. "A" in the singular form used herein intends to include the plural form, unless specified otherwise in the context. It should also be understood that, terms "comprising" and/or "including" used herein specify presence of described features, integers, steps, operations, units and/or components, but do not exclude presence or adding of one or more other features, integers, steps, operations, units, components and/or combination thereof.

It should also be noted that, in some alternative implementations, functions/actions mentioned may occur in an order different from that in the drawings. For example, in practice, depending on the related functions/actions, successive blocks may occur basically simultaneously or in a reverse order.

In the following, the present disclosure will be described in detail with reference to drawings.

According to an aspect of the present disclosure, a method for calling in a network congestion state is provided. The method is implemented by a smart terminal, which may be a mobile phone, a tablet computer, a smart watch, a smart bracelet, a personal digital assistant, or the like. As illustrated in FIG. 1, the method includes the following.

At block 11, the smart terminal sends a connection request to a base station of an enabled cell and starts a timer.

At block 12, when the smart terminal does not receive a connection response after the timer passes a first preset time period, the smart terminal determines a timeout of the enabled cell and sets the enabled cell as being disabled in a second preset time period.

The second preset time period is greater than the first preset time period.

At block 13, the smart terminal repeats actions at block 11 and 12, until the smart terminals receives the connection response within the first preset time period.

At block 14, the smart terminal establishes a connection with a base station of a cell feeding back the connection response.

According to the network environment in the CSFB (Circuit Switched Fallback) mode, conditions and time periods for which congested cells are disabled are flexibly added. Thus, for the smart terminal, when the timeout of the first cell (also known as network congestion) is determined, the first cell can be set as being disabled in the second preset time period, and the smart terminal switches into the second cell. When the timeout of the second cell is determined, since the first cell is disabled, the smart terminal cannot switch to the first cell from the second cell, and can only search for a cell (i.e., the third cell) from other cells. In this way, when a plurality of cells are congested concurrently, it can avoid a cyclic switching among congested cells (in other words, the smart terminal switches to the first cell from the second cell after switching to the second cell from the first cell), and a normal cell (i.e., a third cell) can be selected as soon as possible, thus ensuring a successful MO (mobile origination), improving a call completion rate, and improving user experience.

In at least one embodiment, the method further includes determining by the smart terminal whether a congestion processing condition is satisfied. Sending the connection request by the smart terminal to the base station of the enabled cell includes sending the connection request by the smart terminal to the base station of the enabled cell if the congestion processing condition is satisfied.

In at least one embodiment, determining by the smart terminal whether the congestion processing condition is satisfied includes: recording, by the smart terminal, a number M of redirected wireless access frequency points carried from an LTE; when a wireless resource management module initiates a power scan, recording by the smart terminal, a number N of frequency points each having a received signal strength indication greater than a predetermined threshold; and when M is greater than or equal to a first threshold value and N is greater than or equal to a second threshold value, determining by the smart terminal that the congestion processing condition is satisfied.

In at least one embodiment, setting the enabled cell as being disabled in the second preset time period includes: establishing a blacklist, adding the enabled cell into the blacklist, and setting a disabled time period of the enabled cell as the second preset time period.

In at least one embodiment, the method further includes: counting by the smart terminal, a total disabled time period of each cell in a single day; and when the total disabled time period of a cell is greater than a preset disabled threshold, degrading an access level of the cell by one level.

In at least one embodiment, the method further includes: sending the blacklist to the base station of the cell feeding back the connection response, such that the base station of the cell feeding back the connection response adjusts an access level of each cell based on the blacklist.

Figure 2:
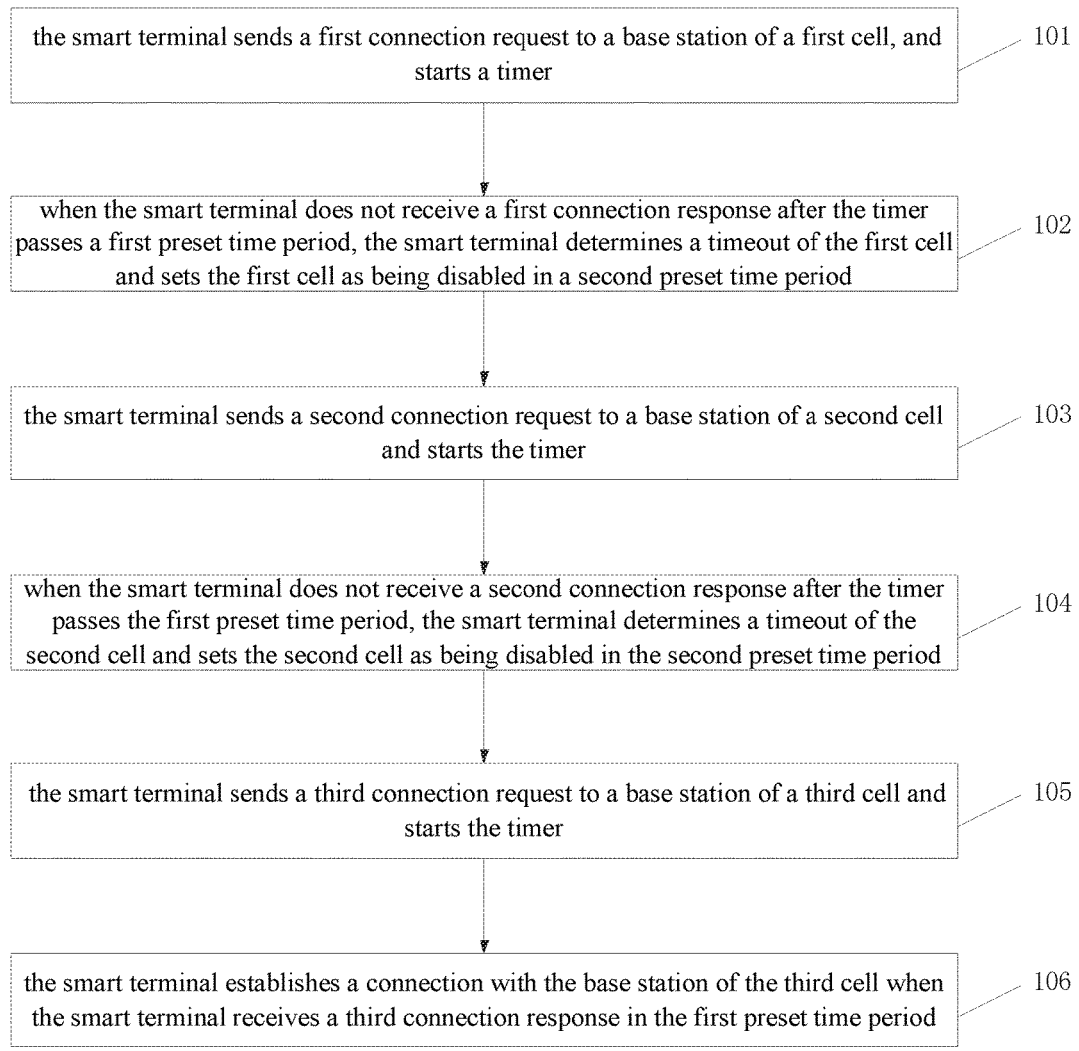
FIG. 2 is a flow chart of a method for calling in a network congestion state according to an embodiment of the present disclosure.

FIG. 2 is a flow chart of a method for calling in a network congestion state according to another embodiment of the present disclosure. As illustrated in FIG. 2, the method includes the following.

At block 101, the smart terminal sends a first connection request to a base station of a first cell, and starts a timer.

The first connection request of the smart terminal may be a connection request sent by the smart terminal to the base station of the first cell. The timer may be a T3126 timer, the specific definition and operation mechanism of which may refer to the specification of the LTE (Long Term Evolution) protocol.

At block 102, when the smart terminal does not receive a first connection response after the timer passes a first preset time period, the smart terminal determines a timeout of the first cell and sets the first cell as being disabled in a second preset time period.

The first connection response in block 102 may be a connection response sent by the base station of the first cell to the smart terminal. The first preset time period may be a time period originally set in the smart terminal (i.e., set by the manufacturer). Certainly, in practice, the first preset time period may be set by a user. The specific value of the first preset time period is not limited in embodiments of the present disclosure. The second preset time period is greater than the first preset time period.

At block 103, the smart terminal sends a second connection request to a base station of a second cell and starts the timer.

The second connection request of the smart terminal may be a connection request sent by the smart terminal to the base station of the second cell. The timer may be a T3126 timer, the specific definition and operation mechanism of which may refer to the specification of the LTE protocol.

At block 104, when the smart terminal does not receive a second connection response after the timer passes the first preset time period, the smart terminal determines a timeout of the second cell and sets the second cell as being disabled in the second preset time period.

The second connection response in block 104 may be a connection response sent by the base station of the second cell to the smart terminal.

At block 105, the smart terminal sends a third connection request to a base station of a third cell and starts the timer.

The third connection request of the smart terminal may be a connection request sent by the smart terminal to the base station of the third cell. The timer may be a T3126 timer, the specific definition and operation mechanism of which may refer to the specification of the LTE protocol.

At block 106, the smart terminal establishes a connection with the base station of the third cell when the smart terminal receives a third connection response in the first preset time period.

The third connection response in block 106 may be a connection response sent by the base station of the third cell to the smart terminal. With respect to the way for establishing the connection with the base station of the third cell, reference may be made to the specification of the LTE protocol, which will not be elaborated herein.

According to the network environment in the CSFB (Circuit Switched Fallback) mode, conditions and time periods for which congested cells are disabled are flexibly added. Thus, for the smart terminal, when the timeout of the first cell (also known as network congestion) is determined, the first cell can be set as being disabled in the second preset time period, and the smart terminal switches into the second cell. When the timeout of the second cell is determined, since the first cell is disabled, the smart terminal cannot switch to the first cell from the second cell, and can only search for a cell (i.e., the third cell) from other cells. In this way, when a plurality of cells are congested concurrently, it can avoid a cyclic switching among congested cells (in other words, the smart terminal switches to the first cell from the second cell after switching to the second cell from the first cell), and a normal cell (i.e., a third cell) can be selected as soon as possible, thus ensuring a successful MO (mobile origination), improving a call completion rate, and improving user experience.

Figure 3:
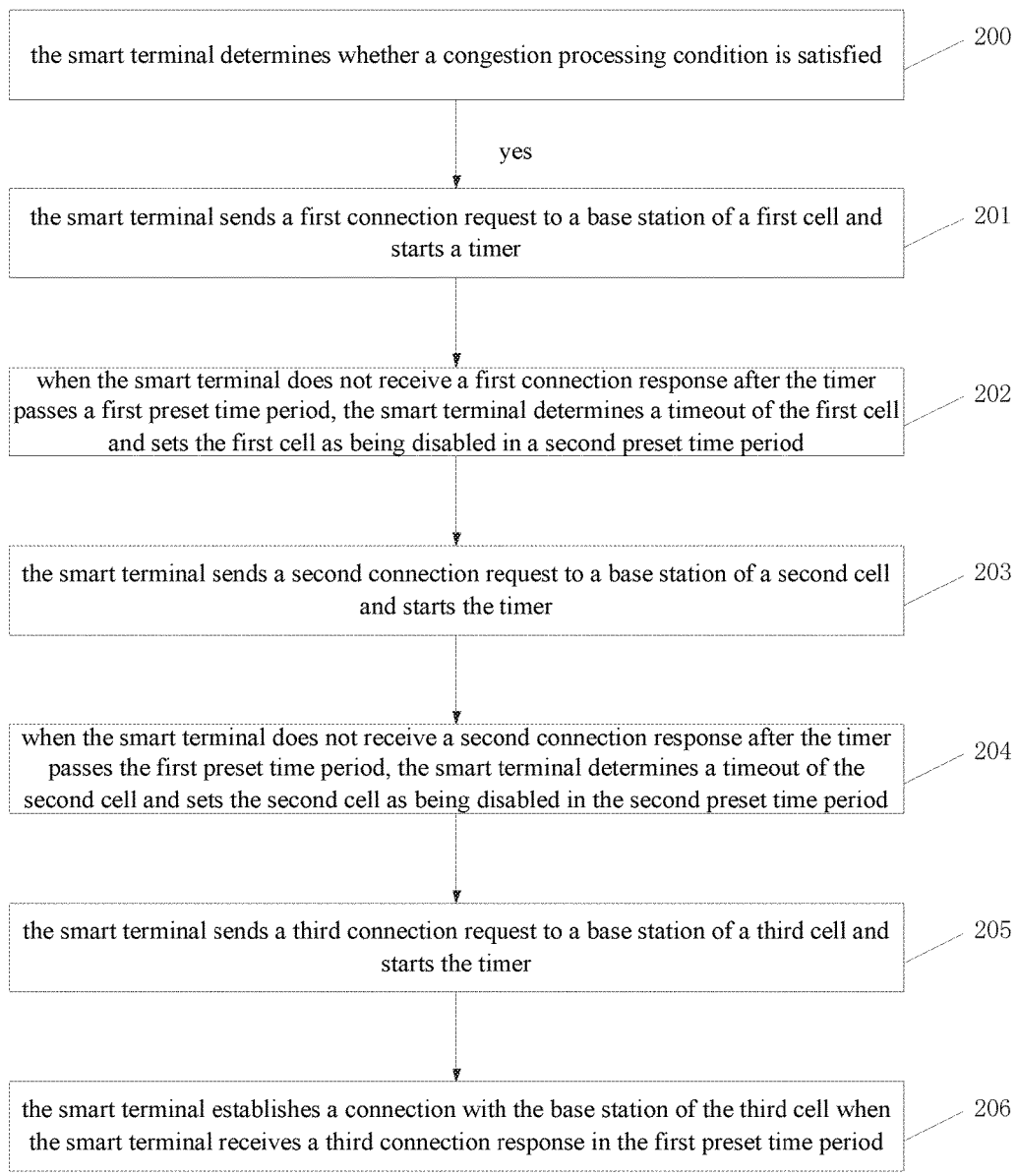
FIG. 3 is a flow chart of a method for calling in a network congestion state according to another embodiment of the present disclosure.

According to another aspect of the present disclosure, a method for calling in a network congestion state is provided. The method is implemented by a smart terminal, which may be a mobile phone, a tablet computer, a smart watch, a smart bracelet, a personal digital assistant, or the like. As illustrated in FIG. 3, the method includes the following.

At block 200, the smart terminal determines whether a congestion processing condition is satisfied. If it is determined that the congestion processing condition is satisfied, following actions at blocks 201-206 are performed.

The smart terminal may determine whether the congestion processing condition is satisfied as follows.

The smart terminal records the number M of redirected wireless access (GERAN) frequency points carried from LTE. When the wireless resource management module initiates a power scan, the smart terminal records the number N of frequency points having a RSSI (Received Signal Strength Indication) greater than a preset threshold (for example, −85 dBm). If M is greater than or equal to a first threshold value and N is greater than or equal to a second threshold value, the smart terminal determines that the congestion processing condition is satisfied. Otherwise, if M is less than the first threshold value or N is less than the second threshold value, the smart terminal determines that the congestion processing condition is not satisfied.

At block 201, the smart terminal sends a first connection request to a base station of a first cell and starts a timer.

The first connection request of the smart terminal may be a connection request sent by the smart terminal to the base station of the first cell. The timer may be a T3126 timer, the specific definition and operation mechanism of which may refer to the specification of the LTE protocol.

At block 202, when the smart terminal does not receive a first connection response after the timer passes a first preset time period, the smart terminal determines a timeout of the first cell and sets the first cell as being disabled in a second preset time period.

The first connection response in block 202 may be a connection response sent by the base station of the first cell to the smart terminal. The first preset time period may be a time period originally set in the smart terminal (i.e., set by the manufacturer). Certainly, in practice, the first preset time period may be set by a user. The specific value of the first preset time period is not limited in embodiments of the present disclosure.

In at least one embodiment, the smart terminal may set the first cell as being disabled in the second preset time period as follows. The smart terminal sets a blacklist (a list including disabled cells), adds the first cell into the blacklist, and sets a disabled time period of the first cell as the second preset time period.

In at least one embodiment, the method may further include: counting a total disabled time period of the first cell in a single day; and degrading an access level of the first cell by one level when the total disabled time period is greater than a preset disabled threshold.

The method may further include: sending the blacklist to the base station, such that the base station adjusts the access level of the first cell based on the blacklist.

At block 203, the smart terminal sends a second connection request to a base station of a second cell and starts the timer.

The second connection request of the smart terminal may be a connection request sent by the smart terminal to the base station of the second cell. The timer may be a T3126 timer, the specific definition and operation mechanism of which may refer to the specification of the LTE protocol.

At block 204, when the smart terminal does not receive a second connection response after the timer passes the first preset time period, the smart terminal determines a timeout of the second cell and sets the second cell as being disabled in the second preset time period.

The second connection response in block 204 may be a connection response sent by the base station of the second cell to the smart terminal.

At block 205, the smart terminal sends a third connection request to a base station of a third cell and starts the timer.

The third connection request of the smart terminal may be a connection request sent by the smart terminal to the base station of the third cell. The timer may be a T3126 timer, the specific definition and operation mechanism of which may refer to the specification of the LTE protocol.

At block 206, the smart terminal establishes a connection with the base station of the third cell when the smart terminal receives a third connection response in the first preset time period.

The third connection response in block 206 may be a connection response sent by the base station of the third cell to the smart terminal. With respect to the way for establishing the connection with the base station of the third cell, reference may be made to the specification of the LTE protocol, which will not be elaborated herein.

In at least one embodiment, before the action at block 203, the smart terminal may further perform following actions.

The smart terminal determines whether the congestion processing condition is satisfied. If M−1 is greater than or equal to the first threshold value and N−1 is greater than or equal to the second threshold value, the smart terminal determines that the congestion processing condition is satisfied, and performs actions at block 203 and subsequent blocks.

According to the network environment in the CSFB (Circuit Switched Fallback) mode, conditions and time periods for which congested cells are disabled are flexibly added. Thus, for the smart terminal, when the timeout of the first cell (also known as network congestion) is determined, the first cell can be set as being disabled in the second preset time period, and the smart terminal switches into the second cell. When the timeout of the second cell is determined, since the first cell is disabled, the smart terminal cannot switch to the first cell from the second cell, and can only search for a cell (i.e., the third cell) from other cells. In this way, when a plurality of cells are congested concurrently, it can avoid a cyclic switching among congested cells (in other words, the smart terminal switches to the first cell from the second cell after switching to the second cell from the first cell), and a normal cell (i.e., a third cell) can be selected as soon as possible, thus ensuring a successful MO (mobile origination), improving a call completion rate, and improving user experience.

Figure 4:
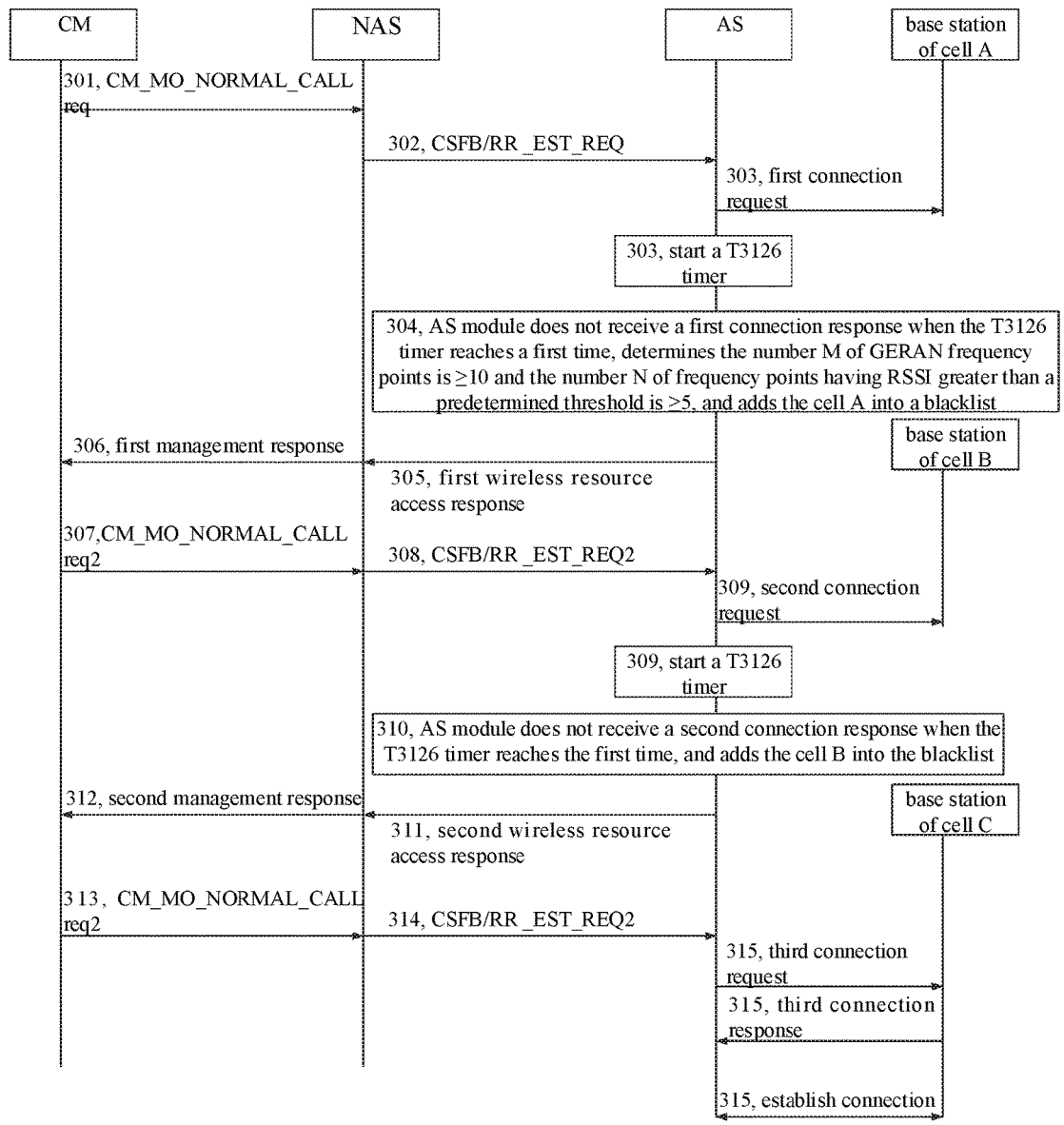
FIG. 4 is a flow chart of a method for calling in a network congestion state according to yet another embodiment of the present disclosure.
Figure 5:
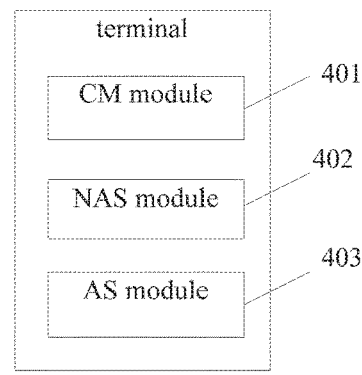
FIG. 5 is a block diagram of a smart terminal according to yet another embodiment of the present disclosure.

FIG. 4 is a flow chart of a method for calling in a network congestion state according to yet another embodiment of the present disclosure. As illustrated in FIG. 4, the method is implemented by a smart terminal, which may be a mobile phone, a tablet computer, a smart watch, a smart bracelet, a personal digital assistant, or the like. As illustrated in FIG. 5, the smart terminal includes a CM (call management) module 401, an NAS (non-access layer) module 402 and an AS (access layer) module 403. As illustrated in FIG. 4, the method includes the following.

At block 301, the CM module sends a first call management request (CM_MO_NORMAL_Call req) to the NAS module.

At block 302, the NAS module sends a first wireless resource access request (CSFB/RR_EST_REQ) to the AS module.

At block 303, the AS module sends a first connection request to a base station of a cell A, and starts a T3126 timer.

At block 304, if the AS module does not receive a first connection response when the T3126 timer reaches a first time, the AS module determines that the number M of GERAN frequency points is greater than or equal to 10 and the number N of frequency points having RSSI greater than a predetermined threshold is greater than or equal to 5, and adds the cell A into a blacklist.

At block 305, the AS module sends a first wireless resource access response to the NAS module, in which the response carries an access failure indication of the cell A (RANDOM_ACCESS_FAILURE).

At block 306, the NAS module sends a first management response to the CM module, in which the first management response may include a redial allowance (redial allowed).

At block 307, the CM module sends a second call management request (CM_MO_NORMAL_CALL req) to the NAS module.

At block 308, the NAS module sends a second wireless resource access request (CSFB/RR_EST_REQ) to the AS module.

At block 309, the AS module starts the T3126 timer, and sends a second connection request to a base station of a cell B.

At block 310, the AS module adds the cell B into the blacklist if the AS module does not receive a second connection response when the T3126 timer reaches the first time.

At block 311, the AS module sends a second wireless resource access response to the NAS module, in which the response carries an access failure indication of the cell B (RANDOM_ACCESS_FAILURE).

At block 312, the NAS module sends a second management response to the CM module, in which the second management response may include a redial allowance (redial allowed).

At block 313, the CM module sends a third call management request 3 (CM_MO_NORMAL_CALL req) to the NAS module.

At block 314, the NAS module sends a third wireless resource access request (CSFB_RR_EST REQ) to the AS module.

At block 315, the AS module sends a third connection request to a cell C, and establishes a connection with the cell C after receiving a third connection response from the base station of the cell C.

According to the method provided by the embodiment illustrated in FIG. 4, when the cell A and cell B have a timeout, both cell A and cell B are added into the blacklist and are disabled for a preset time period (for example, 30 s), such that when cell B also has a timeout, the smart terminal will not return to cell A, since the cell A is in the blacklist. In this way, when a plurality of cells have a congestion concurrently, a cyclic switching among congested cells (i.e., the smart terminal switches to the first cell from the second cell after switching to the second cell from the first cell) can be avoided, and a normal cell (i.e., the third cell) can be selected as soon as possible, thus ensuring a successful MO, improving a call completion rate and improving user experience.

Figure 6:
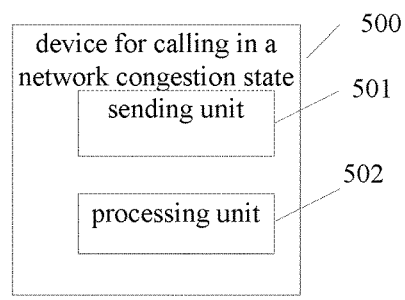
FIG. 6 is a block diagram of a device for calling in a network congestion state according to an embodiment of the present disclosure.

FIG. 6 is a block diagram of a device for calling in a network congestion state according to an embodiment of the present disclosure. As illustrated in FIG. 6, the device 500 includes a sending unit 501 and a processing unit 502.

The sending unit 501 is configured to send a connection request to a base station of an enabled cell, and start a timer.

The processing unit 502 is configured to determine a timeout of the enabled cell and set the enabled cell as being disabled in a second preset time period, when a connection response is not received after the timer passes a first preset time period.

The second preset time period is greater than the first preset time period.

The sending unit 501 and the processing unit 502 are configured to execute respective actions until the smart terminal receives a connection response within the first preset time period.

The processing unit 502 is further configured to establish a connection with a base station of a cell feeding back the connection response when the connection response is received within the first preset time period.

In at least one embodiment, the processing unit 502 is further configured to: determine whether a congestion processing condition is satisfied; and control the sending unit to send the connection request to the base station of the enabled cell if the congestion processing condition is satisfied.

In at least one embodiment, the processing unit 502 is configured to: record a number M of redirected wireless access frequency points carried from an LTE; when a wireless resource management module initiates a power scan, record a number N of frequency points each having a received signal strength indication greater than a predetermined threshold; and when M is greater than or equal to a first threshold value and N is greater than or equal to a second threshold value, determine that the congestion processing condition is satisfied.

In at least one embodiment, the processing unit 502 is further configured to establish a blacklist, add the enabled cell into the blacklist, and set a disabled time period of the enabled cell as the second preset time period.

In at least one embodiment, the processing unit 502 is further configured to: count a total disabled time period of each cell in a single day; and when the total disabled time period of a cell is greater than a preset disabled threshold, degrade an access level of the cell by one level.

Details of embodiments of the present disclosure may be realized in other specific forms, without departing from the spirit or basic features of the present disclosure. Thus, from every point, the embodiments should be regarded as exemplary and nonrestrictive, and the scope of the present disclosure should be limited by appended claims other than the above description. Therefore, it is intended to include all variants falling into the scope of equivalent features of the claims into the present disclosure. Any reference number in the claims should not be regarded as limitation to the claims. Moreover, "comprising" does not exclude other non-listed units or steps, and "a" does not exclude the plural form. A plurality of units or devices defined in the system claim may be realized by one unit or device through hardware or software. Terms such as first and second are used to represent names and does not indicate any particular order.

Flow charts and block diagrams in the drawings illustrate possible architecture structures, functions and operations of methods, systems and software program products according to embodiments of the present disclosure. In this regard, each block in the flow chart or block diagram may represent one module, program segment or a portion of codes, which includes one or more executable instructions configured to implement a specified logic function. It should also be noted that, in some alternative implementations, the functions in the blocks may occur in an order different from that in the drawings. For example, in practice, two successive blocks may be executed basically in parallel, or may be executed in a reverse order, which depends on the related functions. It should also be noted that, respective blocks in the flow charts and/or block diagrams and any combination of blocks in the flow charts and/or block diagrams may be realized by a dedicated and hardware-based system configured to implement specified functions or actions, or may be realized by a combination of dedicated hardware and computer instructions.

Figure 7:
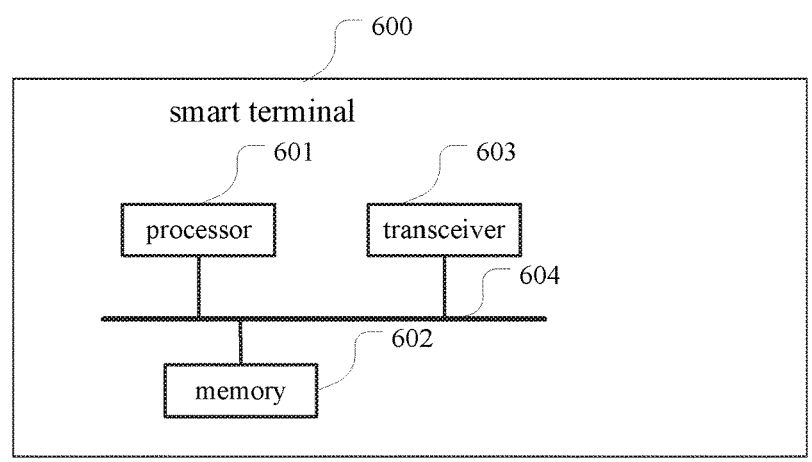
FIG. 7 is a schematic diagram illustrating a hardware structure of a smart terminal provided by the present disclosure.

Embodiments of the present disclosure further provide a smart terminal. The smart terminal includes but is not limited to, a smart phone, a smart watch, a tablet computer, a personal computer, a laptop computer, or a computer group. As illustrated in FIG. 7, the smart terminal 600 includes a processor 601, a memory 602, a transceiver 603 and a bus 606. The transceiver 603 is configured to transmit data to an external device and receive data from the external device. There may be one or more processors 601 in the smart terminal 600. In some embodiments of the present disclosure, the processor 601, the memory 602 and the transceiver 603 are coupled via a bus system or in other ways. The smart terminal 600 may be configured to implement the methods as illustrated in FIGS. 1-4. With respect to meanings and examples of terms in embodiments, reference may be made to description corresponding to FIGS. 1-4, which will not be elaborated here.

The memory 602 is configured to store program codes. The processor 601 is configured to perform actions as illustrated in FIGS. 1-4 by executing the program codes stored in the memory 602.

It should be noted that, the processor 601 here may be a single processing element, or may be a joint name of a plurality of processing elements. For example, the processing element may be a CPU (Central Processing Unit), or an ASIC (Application Specific Integrated Circuit), or one or more integrated circuits configured to implement embodiments of the present disclosure, for example, one or more DSPs (Digital Signal Processor), or one or more FPGAs (Field Programmable Gate Array).

The memory 602 may be a single storage device, or may be a joint name of a plurality of storage elements. The memory 602 is configured to store executable program codes or parameters and data required by an application execution device for running. The memory 602 may include a RAM, or may include a non-volatile memory, for example, a disk memory, a flash memory, or the like.

The bus 606 may be an ISA (Industry Standard Architecture) bus, a PCI (Peripheral Component) bus or an EISA (Extended Industry Standard Architecture) bus. The bus may be classified as an address bus, a data bus, a control bus, or the like. For convenience, only one thick line is used to represent the bus in FIG. 6, however, it does not indicate that there is only one bus or only one kind of bus.

The terminal may further include an input/output device. The input/output device is coupled to the bus 606, so as to be coupled to other parts such as the processor 601 via the bus. The input/output device provides an input interface to an operator, such that the operator can select monitor items through the input interface. The input/output device may also include other interfaces, via which, the terminal is coupled to another device.

Those skilled in the art may be aware that, for convenience and clarity, with respect to the specific working process of the system, the device and the unit, reference may be made to the corresponding description of the method embodiment, which are not elaborated here.

In embodiments of the present disclosure, it should be understood that, the disclosed system, device and method may be implemented in other ways. For example, the described device embodiments are merely exemplary. The partition of units is merely a logical function partitioning. There may be other partitioning ways in practice. For example, several units or components may be integrated into another system, or some features may be omitted or not implemented. Further, the coupling or direct coupling or communication connection between each other described or illustrated may be implemented via some interfaces. The indirect coupling or communication connection between devices or units may be implemented in an electrical, mechanical or other manner.

In embodiments of the present disclosure, it should be understood that, the units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, each functional unit in the present disclosure may be integrated in one progressing module, or each functional unit exists as an independent unit, or two or more functional units may be integrated in one module.

If the integrated module is embodied in software and sold or used as an independent product, it can be stored in the computer readable storage medium. Based on this, the technical solution of the present disclosure or a part making a contribution to the related art or a part of the technical solution may be embodied in a manner of software product. The computer software produce is stored in a storage medium, including some instructions for causing one computer device (such as a personal PC, a server, or a network device etc.) to execute all or some of steps of the method according to embodiments of the present disclosure. The above-mentioned storage medium may be a medium able to store program codes, such as, USB flash disk, mobile hard disk drive (mobile HDD), read-only memory (ROM), random-access memory (RAM), a magnetic tape, a floppy disc, an optical data storage device, and the like.

Although explanatory embodiments have been illustrated and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for calling in a network congestion state, comprising:
   sending a connection request by a smart terminal to a base station of an enabled cell, and starting a timer;
   when the smart terminal does not receive a connection response after the timer passes a first preset time period, determining a timeout of the enabled cell and setting the enabled cell as being disabled in a second preset time period, wherein the second preset time period is greater than the first preset time period;
   repeating actions of sending, starting, determining and setting, until the smart terminal receives the connection response within the first preset time period; and
   establishing a connection by the smart terminal with a base station of a cell feeding back the connection response,
   wherein setting the enabled cell as being disabled in the second preset time period comprises:
   establishing a blacklist, adding the enabled cell into the blacklist, and setting a disabled time period of the enabled cell as the second preset time period, the method further comprises:
   counting by the smart terminal, a total disabled time period of each cell in a single day; and
   when the total disabled time period of a cell is greater than a preset disabled threshold, degrading an access level of the cell by one level.

2. The method according to claim 1, further comprising:
   determining by the smart terminal whether a congestion processing condition is satisfied;
   wherein sending the connection request by the smart terminal to the base station of the enabled cell comprises sending the connection request by the smart terminal to the base station of the enabled cell if the congestion processing condition is satisfied.

3. The method according to claim 2, wherein determining by the smart terminal whether the congestion processing condition is satisfied comprises:
   recording, by the smart terminal, a number M of redirected wireless access frequency points carried from an LTE;
   when a wireless resource management module initiates a power scan, recording by the smart terminal, a number N of frequency points each having a received signal strength indication greater than a predetermined threshold; and
   when M is greater than or equal to a first threshold value and N is greater than or equal to a second threshold value, determining by the smart terminal that the congestion processing condition is satisfied.

4. The method according to claim 1, further comprising:
   sending the blacklist to the base station of the cell feeding back the connection response, such that the base station of the cell feeding back the connection response adjusts an access level of each cell based on the blacklist.

5. A device for calling in a network congestion state, comprising a non-transitory computer-readable medium comprising computer-executable instructions stored thereon, and an instruction execution system which is configured by the instructions to implement:
   a sending unit, configured to send a connection request to a base station of an enabled cell, and start a timer, and
   a processing unit, configured to determine a timeout of the enabled cell and set the enabled cell as being disabled in a second preset time period, when a connection response is not received after the timer passes a first preset time period, wherein the second preset time period is greater than the first preset time period, wherein the processing unit is configured to set the enabled cell as being disabled in the second preset time period by establishing a blacklist, adding the enabled cell into the blacklist, and setting a disabled time period of the enabled cell as the second preset time period, wherein the instruction execution system is configured by the instructions to enable the sending unit and the processing unit to further execute actions respectively until the smart terminal receives a connection response within the first preset time period, and the processing unit is further configured to establish a connection with a base station of a cell feeding back the connection response when the connection response is received within the first preset time period, wherein the processing unit is further configured to:
 count a total disabled time period of each cell in a single day; and
 when the total disabled time period of a cell is greater than a preset disabled threshold, degrade an access level of the cell by one level.

6. The device according to claim 5, wherein the processing unit is further configured to:
 determine whether a congestion processing condition is satisfied; and
 control the sending unit to send the connection request to the base station of the enabled cell if the congestion processing condition is satisfied.

7. The device according to claim 6, wherein the processing unit is configured to:
 record a number M of redirected wireless access frequency points carried from an LTE;
 when a wireless resource management module initiates a power scan, record a number N of frequency points each having a received signal strength indication greater than a predetermined threshold; and
 when M is greater than or equal to a first threshold value and N is greater than or equal to a second threshold value, determine that the congestion processing condition is satisfied.

8. The device according to claim 5, wherein the sending unit is further configured to:
 send the blacklist to the base station of the cell feeding back the connection response, such that the base station of the cell feeding back the connection response adjusts an access level of each cell based on the blacklist.

9. A method for calling in a network congestion state, comprising:
 sending a first connection request by a smart terminal to a base station of a first cell, and starting a timer;
 when the smart terminal does not receive a first connection response after the timer passes a first preset time period, determining a timeout of the first cell and setting the first cell as being disabled in a second preset time period, wherein the second preset time period is greater than the first preset time period;
 sending a second connection request by the smart terminal to a base station of a second cell, and starting the timer;
 when the smart terminal does not receive a second connection response after the timer passes the first preset time period, determining a timeout of the second cell and setting the second cell as being disabled in the second preset time period;
 sending a third connection request by the smart terminal to a base station of a third cell, and starting the timer;
 when the smart terminal receives a third connection response in the first preset time period, establishing a connection by the smart terminal with the base station of the third cell,
 wherein setting the first cell as being disabled in the second preset time period comprises: establishing a blacklist, adding the first cell into the blacklist, and setting a disabled time period of the first cell as the second preset time period;
 wherein the method further comprises:
  counting by the smart terminal, a total disabled time period of the first cell in a single day; and
  degrading an access level of the first cell by one level when the total disabled time period is greater than a preset disabled threshold.

10. The method according to claim 9, wherein before sending the first connection request by the smart terminal to the base station of the first cell, the method further comprises:
 determining by the smart terminal whether a congestion processing condition is satisfied, and sending the first connection request by the smart terminal to the base station of the first cell if the congestion processing condition is satisfied.

11. The method according to claim 10, wherein determining by the smart terminal whether the congestion processing condition is satisfied comprises:
 recording, by the smart terminal, a number M of redirected wireless access frequency points carried from an LTE;
 when a wireless resource management module initiates a power scan, recording by the smart terminal, a number N of frequency points each having a received signal strength indication greater than a predetermined threshold; and
 when M is greater than or equal to a first threshold value and N is greater than or equal to a second threshold value, determining by the smart terminal that the congestion processing condition is satisfied.

* * * * *